(12) United States Patent
Konitzer et al.

(10) Patent No.: US 9,975,175 B2
(45) Date of Patent: May 22, 2018

(54) METALLIC STRUCTURE

(71) Applicant: General Electric Company, Schenectady, NY (US)

(72) Inventors: Douglas Gerard Konitzer, West Chester, OH (US); James Herbert Deines, Mason, OH (US); Brian David Przeslawski, Liberty Township, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 14/761,569

(22) PCT Filed: Oct. 11, 2013

(86) PCT No.: PCT/US2013/064548
§ 371 (c)(1),
(2) Date: Jul. 16, 2015

(87) PCT Pub. No.: WO2014/113101
PCT Pub. Date: Jul. 24, 2014

(65) Prior Publication Data
US 2015/0360284 A1    Dec. 17, 2015

Related U.S. Application Data

(60) Provisional application No. 61/753,394, filed on Jan. 16, 2013.

(51) Int. Cl.
B22C 9/04 (2006.01)
B22C 9/22 (2006.01)
(Continued)

(52) U.S. Cl.
CPC .............. B22D 25/02 (2013.01); B22C 7/02 (2013.01); B22C 9/04 (2013.01); B22C 9/22 (2013.01);
(Continued)

(58) Field of Classification Search
CPC ........ B22D 25/02; B22D 27/045; B22C 7/02; B22C 9/04; B22C 9/22
(Continued)

(56) References Cited

U.S. PATENT DOCUMENTS 5,618,633 A    4/1997    Swanson et al.
6,110,602 A    8/2000    Dickens et al.
(Continued)

FOREIGN PATENT DOCUMENTS

CN    1469030 A    1/2004
CN    1693014 A    11/2005
(Continued)

OTHER PUBLICATIONS

Williams et al., "Additive manufacturing of metallic cellular materials via three-dimensional printing", The International Journal of Advanced Manufacturing Technology, vol. No. 53 , Issue No. 1-4, pp. 231-239, Jul. 17, 2010.
(Continued)

*Primary Examiner* — Kevin P Kerns
(74) *Attorney, Agent, or Firm* — General Electric Company; William Scott Andes (57) ABSTRACT

A method of casting a truss structure having spaced face sheets connected by columnar structures, including forming a three-dimensional pattern (3D pattern) in the shape of the truss structure with the spaced face sheets and columnar structures, forming a mold core of the 3D pattern by surrounding the pattern with a liquid and letting the liquid harden about the 3D pattern, removing the 3D pattern from
(Continued)

the mold core, filling the mold core with a liquid alloy to cast and directionally solidify the truss structure.

15 Claims, 6 Drawing Sheets

(51) Int. Cl.
*B22C 7/02* (2006.01)
*B22D 25/02* (2006.01)
*B22D 27/04* (2006.01)
*B29C 67/00* (2017.01)
*B29L 31/08* (2006.01)

(52) U.S. Cl.
CPC ........ *B22D 27/045* (2013.01); *B29C 67/0051* (2013.01); *B29L 2031/08* (2013.01)

(58) Field of Classification Search
USPC ........ 164/15, 28, 516, 361, 45, 122.1, 122.2
See application file for complete search history.

(56) References Cited

U.S. PATENT DOCUMENTS

| | | |
|---|---|---|
| 6,695,582 B2 | 2/2004 | Bunker et al. |
| 7,296,615 B2 | 11/2007 | Devine, II et al. |
| 7,382,959 B1 | 6/2008 | Jacobsen |
| 7,487,819 B2 | 2/2009 | Wang et al. |
| 7,653,279 B1 | 1/2010 | Jacobsen |
| 7,687,132 B1 | 3/2010 | Gross et al. |
| 8,042,312 B2 | 10/2011 | Kang et al. |
| 2006/0138692 A1 | 6/2006 | Suzuki et al. |
| 2010/0104446 A1 | 4/2010 | Vehr et al. |
| 2013/0255351 A1 | 10/2013 | Nanba et al. |

FOREIGN PATENT DOCUMENTS

| | | |
|---|---|---|
| CN | 1874859 A | 12/2006 |
| CN | 101219461 A | 7/2008 |
| EP | 1452251 A1 | 9/2004 |
| JP | 2000500707 A | 1/2000 |
| JP | 2004261816 A | 9/2004 |
| JP | 2010106833 A | 5/2010 |
| WO | 199819843 A1 | 5/1998 |
| WO | 200009307 A2 | 2/2000 |
| WO | 2012086038 A1 | 6/2012 |

OTHER PUBLICATIONS

International Search Report and Written Opinion issued in connection with corresponding PCT Application No. PCT/US2013/064548 dated Apr. 16, 2014.
Unofficial English Translation of Japanese Search Report issued in connection with corresponding JP Application No. 2015552627 dated Jan. 31, 2017.
Maheri et al., "A Robust Method for Integrated Design of Trusses Supporting Disturbed Loads", Engineering Structures, vol. No. 40, pp. 339-349, 2012.
Nishikiori, "Titanium Alloys in Aircraft Engine", Progress of Latest Titanium Technology, pp. 2-9, Aug. 30, 2016.
Takahashi, "Aircraft Engines", Advances in Production Technology, pp. 9-12, Aug. 30, 2016.
Unofficial English Translation of Japanese office action issued in connection with corresponding JP Application No. 2015552627 dated Aug. 30, 2016.
Unofficial English Translation of Chinese Office Action issued in connection with corresponding CN Application No. 201380070687.X dated May 4, 2016.

METALLIC STRUCTURE

CROSS-REFERENCE TO RELATED APPLICATIONS

This is a national stage application under 35 U.S.C. § 371(c) of prior-filed, co-pending, PCT application serial number PCT/US2013/064548, filed on Oct. 11, 2013, which claims the benefit of U.S. Provisional Patent Application No. 61/753,394, entitled Metallic Structure and filed on Jan. 16, 2013. These applications are incorporated herein in their entirety.

BACKGROUND OF THE INVENTION

Turbine rotor assemblies typically include at least one row of circumferentially spaced rotor blades. Each rotor blade includes an airfoil that includes a pressure side and a suction side connected together at leading and trailing edges. Each airfoil extends radially outward from a rotor blade platform. Each rotor blade also includes a dovetail that extends radially inward from a shank extending between the platform and the dovetail. The dovetail is used to mount the rotor blade within the rotor assembly to a rotor disk or spool. Known blades are hollow such that an internal cooling cavity is defined at least partially by the airfoil, platform, shank, and dovetail.

Airfoils may be produced in a number of ways. For example, turbine blades may be cast out of nickel superalloy single crystals. In addition, there are general casting methods for producing single crystal structures. Also, turbine blades may be cast with a known crystallographic direction along the casting axis and sometimes even with control of a secondary orientation.

BRIEF DESCRIPTION OF THE INVENTION

In one aspect, an embodiment of the invention relates to a method of casting a truss structure having spaced face sheets connected by columnar structures, including forming a three-dimensional pattern (3D pattern) in the shape of the truss structure with the spaced face sheets and columnar structures, forming a mold core of the 3D pattern by surrounding the pattern with a liquid and letting the liquid harden about the 3D pattern, removing the 3D pattern from the mold core, after removing the 3D pattern filling the mold core with a liquid alloy and directionally solidifying the liquid alloy to form the casting of the truss structure, and removing the mold core from the casting of the truss structure.

DETAILED DESCRIPTION OF THE INVENTION

Figure 1:
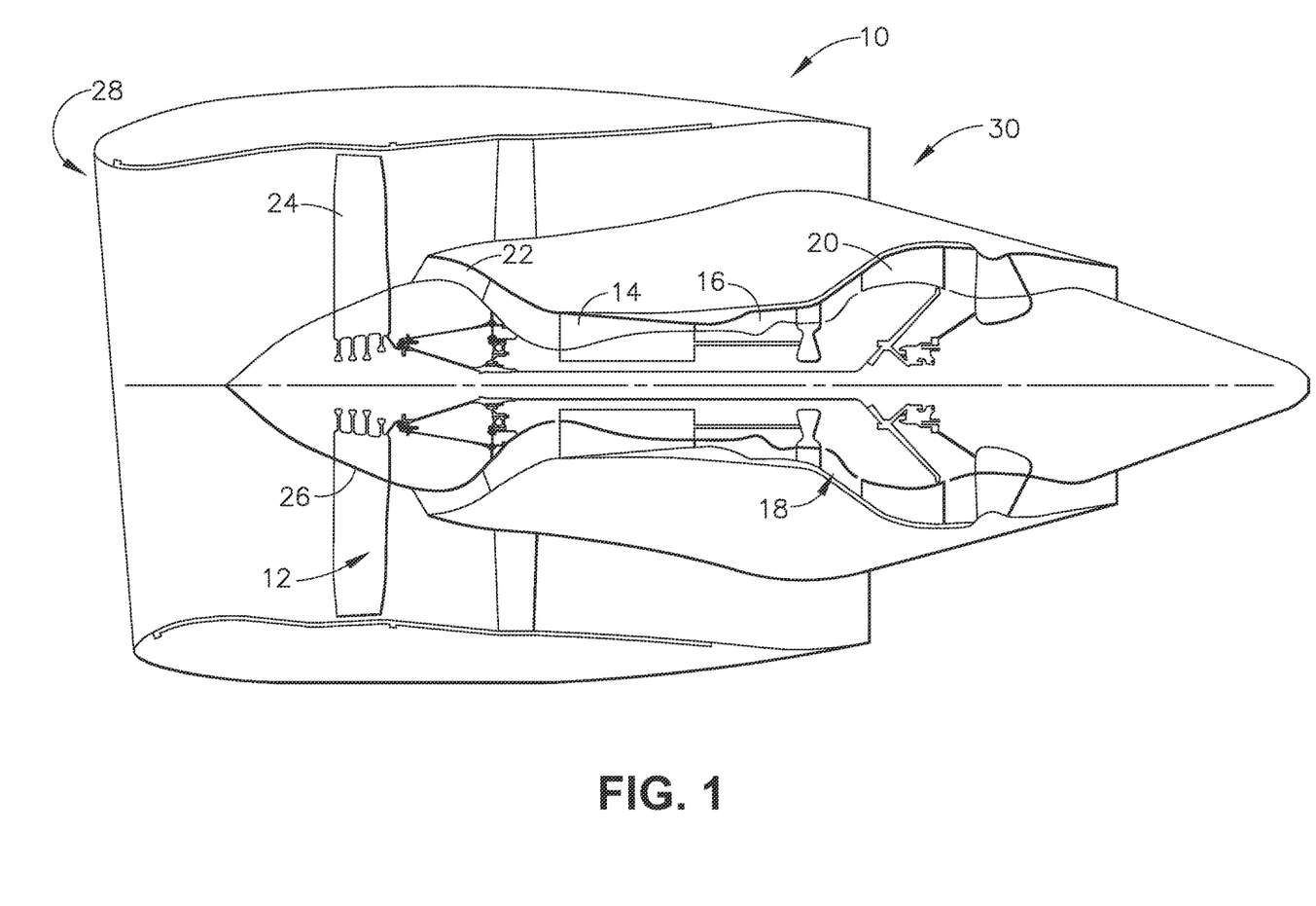
FIG. 1 is a schematic illustration of an exemplary gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, engine 10 is a CT7 engine commercially available from General Electric Aircraft Engines, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
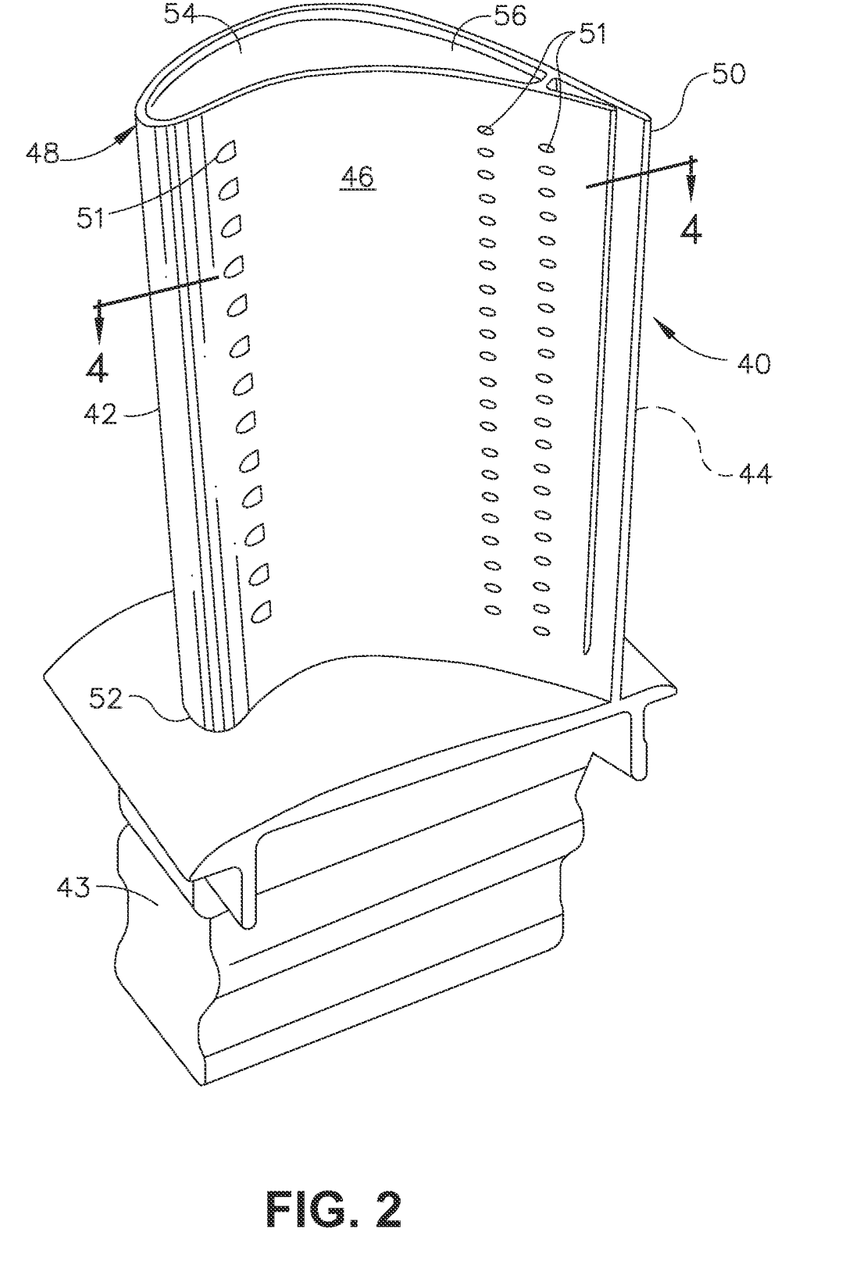
FIG. 2 is a perspective view of an exemplary rotor blade that may be used with the gas turbine engine illustrated in FIG. 1.
Figure 3:
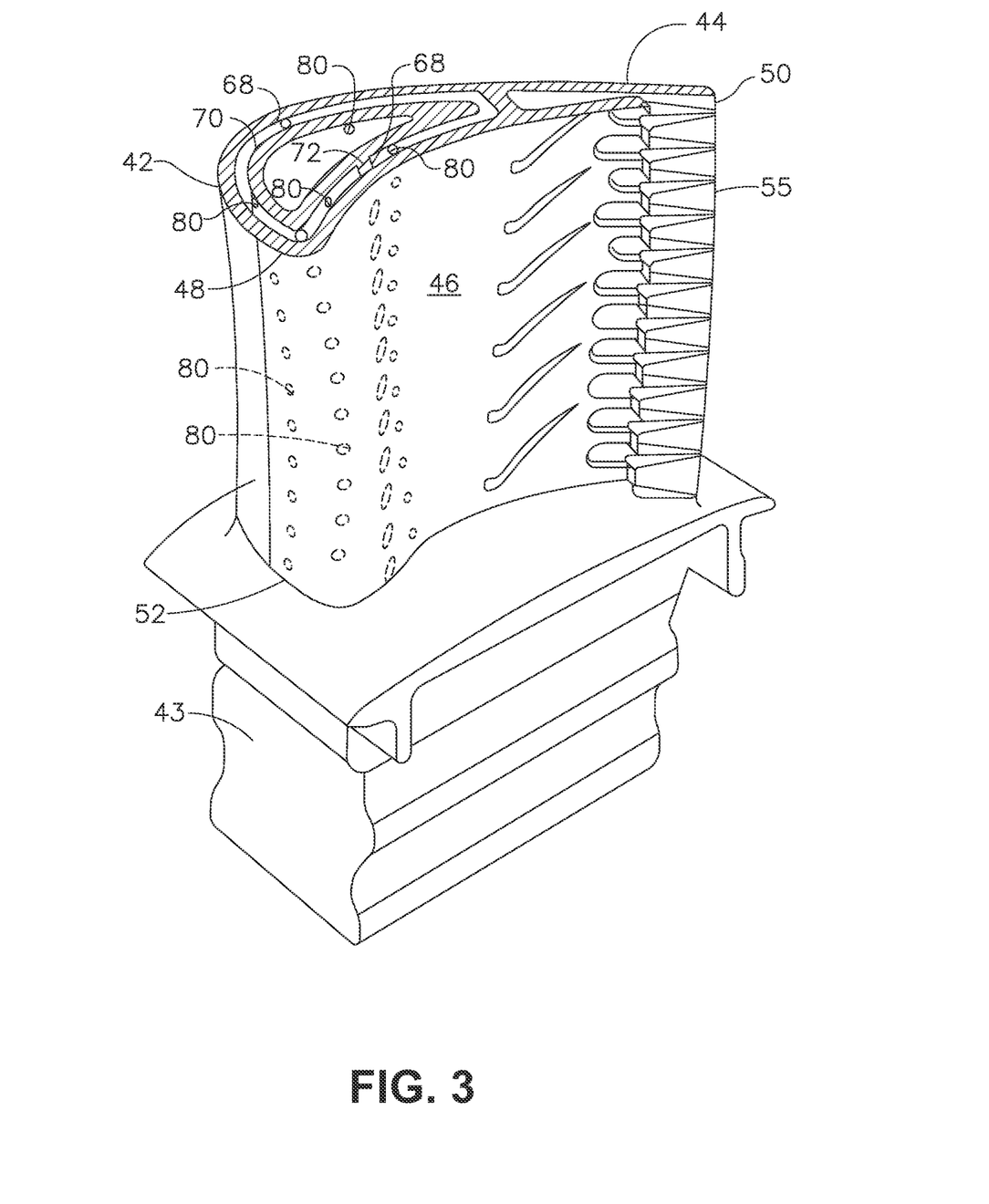
FIG. 3 is a perspective view of a portion of the rotor blade illustrated in FIG. 2 and taken along line 4.
Figure 4:
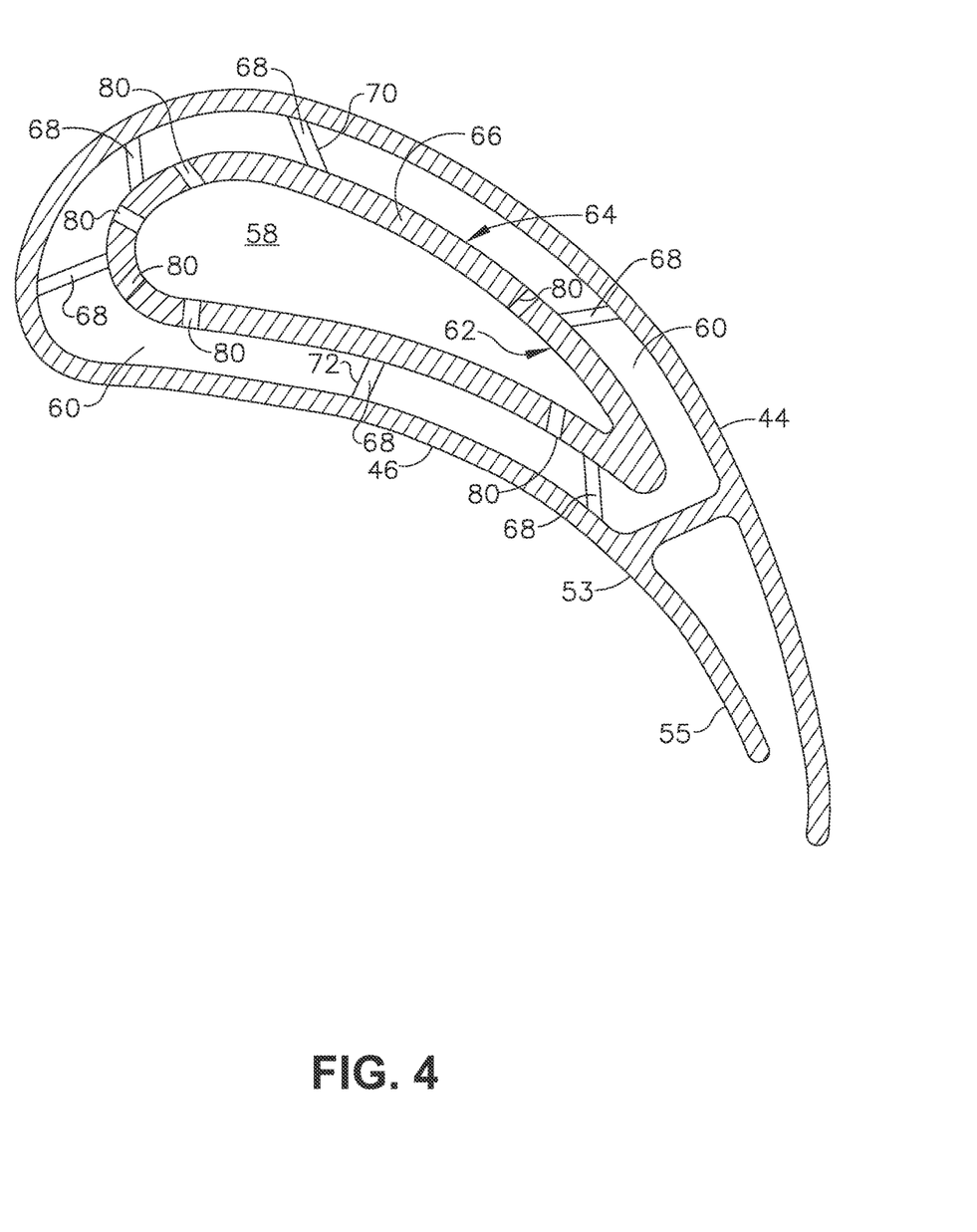
FIG. 4 is a cross-sectional view of the rotor blade illustrated in FIG. 2 and taken along line 4.

FIG. 2 is a perspective view of a rotor blade 40 that may be used with gas turbine engine 10 (shown in FIG. 1). FIG. 3 is a perspective view of a portion of rotor blade 40 and taken along line 4. FIG. 4 is a cross-sectional view of rotor blade 40 taken along line 4. In one embodiment, a plurality of rotor blades 40 form a high pressure turbine rotor blade stage (not shown) of gas turbine engine 10. Each rotor blade 40 includes a hollow airfoil 42 and an integral dovetail 43 used for mounting airfoil 42 to a rotor disk (not shown) in a known manner.

Airfoil 42 includes a first sidewall 44 and a second sidewall 46. First sidewall 44 is convex and defines a suction side of airfoil 42, and second sidewall 46 is concave and defines a pressure side of airfoil 42. Sidewalls 44 and 46 are connected together at a leading edge 48 and at an axially-spaced trailing edge 50 of airfoil 42 that is downstream from leading edge 48. Airfoil 42 includes a plurality of film holes 51 that are spaced radially along sidewalls 44 and 46 and between an airfoil tip 54 and a blade root 52 for discharging cooling fluid from airfoil 42 to facilitate cooling an outer surface 53 of airfoil 42. Film holes 51 may be of any number or position on either first or second sidewall 44 and 46 that enable airfoil 42 to function as described herein. Airfoil 42 also includes a plurality of trailing edge slots 55 spaced radially between airfoil tip 54 and blade root 52 along trailing edge 50 for discharging cooling fluid from airfoil 42 to facilitate cooling airfoil trailing edge 50. Heat transfer enhanced by film holes 51 and trailing edge slots 55 facilitates cooling along airfoil outer surface 53.

First and second sidewalls 44 and 46, respectively, extend radially from blade root 52 positioned adjacent dovetail 43 to airfoil tip 54 which defines a radial outer boundary of an internal cavity 56. Cavity 56 is defined within airfoil 42 between sidewalls 44 and 46. In the exemplary embodiment, cavity 56 is divided into a central plenum 58 and an impingement chamber 60.

Central plenum 58 has an inner surface 62 and an outer surface 64 that together define a central plenum wall 66. Central plenum 58 extends radially from blade root 52 to airfoil tip 54 and is in flow communication with a cooling fluid source (not shown) located within engine 10. Alternatively, central plenum 58 may extend radially along a portion of airfoil 42 from blade root 52 to airfoil tip 54.

One or more struts 68 extend through impingement chamber 60 from central plenum wall 66 to first and second sidewalls 44 and 46. Struts 68 support central plenum wall 66 and enable impingement chamber 60 to substantially circumscribe central plenum 58. In the exemplary embodiment, one row of struts 70 couples central plenum wall 66 to first sidewall 44, and a second row of struts 72 couples central plenum wall 66 to second sidewall 46. Alternatively, any number of struts 68, whether arranged in rows or otherwise, may couple central plenum wall 66 to first and second sidewalls 44 and 46.

In the exemplary embodiment, first and second rows of struts 70 and 72 each include at least one strut 68. Each strut 68 in rows 70 and 72 is substantially aligned with adjacent struts 68 such that rows 70 and 72 each extend radially from blade root 52 to airfoil tip 54 in a straight or substantially straight line. Alternatively, each strut 68 may have any orientation, arrangement, spacing, size, length, and/or geometry that enable airfoil 42 to function as described herein.

At least one hole 80, or impingement jet, extends from inner surface 62 to outer surface 64. Holes 80 fluidly couple central plenum 58 to impingement chamber 60 and facilitate cooling first and second sidewalls 44 and 46. In the exemplary embodiment, six rows of holes 80 are formed in central plenum wall 66, as shown in FIGS. 3 and 4. Each row of holes 80 extends from blade root 52 to airfoil tip 54 in a straight line, substantially straight line, or arcuate arrangement. Each row has at least one hole 80. Alternatively, central plenum wall 66 may have any number of holes 80 or rows of holes 80, and each hole 80 or row of holes 80 may have any orientation, arrangement, spacing, size, length and/or geometry that enable airfoil 42 to function as described herein.

Film cooling holes 51 are formed in sidewalls 44 and 46 and are coupled to impingement chamber 60 such that cooling fluid in impingement chamber 60 may be discharged from airfoil 42. Impingement chamber 60 may also be coupled to trailing edge slots 55 via one or more channels (not shown) that facilitate the discharge of cooling fluid from impingement chamber 60 and airfoil 42.

During operation, a cooling fluid, typically air, from the cooling fluid source is channeled to central plenum 58. Cooling fluid flows through central plenum 58 from blade root 52 toward airfoil tip 54 and impinges directly into impingement chamber 60 via holes 80. More specifically, cooling fluid is impinged into first and second sidewalls 44 and 46 thereby cooling first and second sidewalls 44 and 46. Cooling fluid discharges from impingement chamber 60 and airfoil 42 via film cooling holes 51 and trailing edge slots 55.

The first and second sidewalls 44 and 46, central plenum wall 66 and the one or more struts 68 may have any configuration suitable to provide favorable properties for a component, including by way of non-limiting example, the airfoil 42 described above used in aviation applications. For example the struts 68 and walls may have a truss structure. While such a truss structure may be utilized in any appropriate environment, including outside of aviation, the remainder of the description will be limited to the airfoil 42 as described above. It will be understood that the truss structure may be a micro truss structure, which is small including that the micro truss structure may have dimensions as detailed below.

The truss structure may be directionally solidified, resulting in columnar grain or single crystal structure. For example, single crystal control may allow one to choose structural orientations based on the properties of that specific crystallographic orientation. Embodiments of the invention allow tailoring the structure of the truss structure in multiple orientations to take advantage of the different properties which exist in the different crystallographic orientations.

Figure 5:
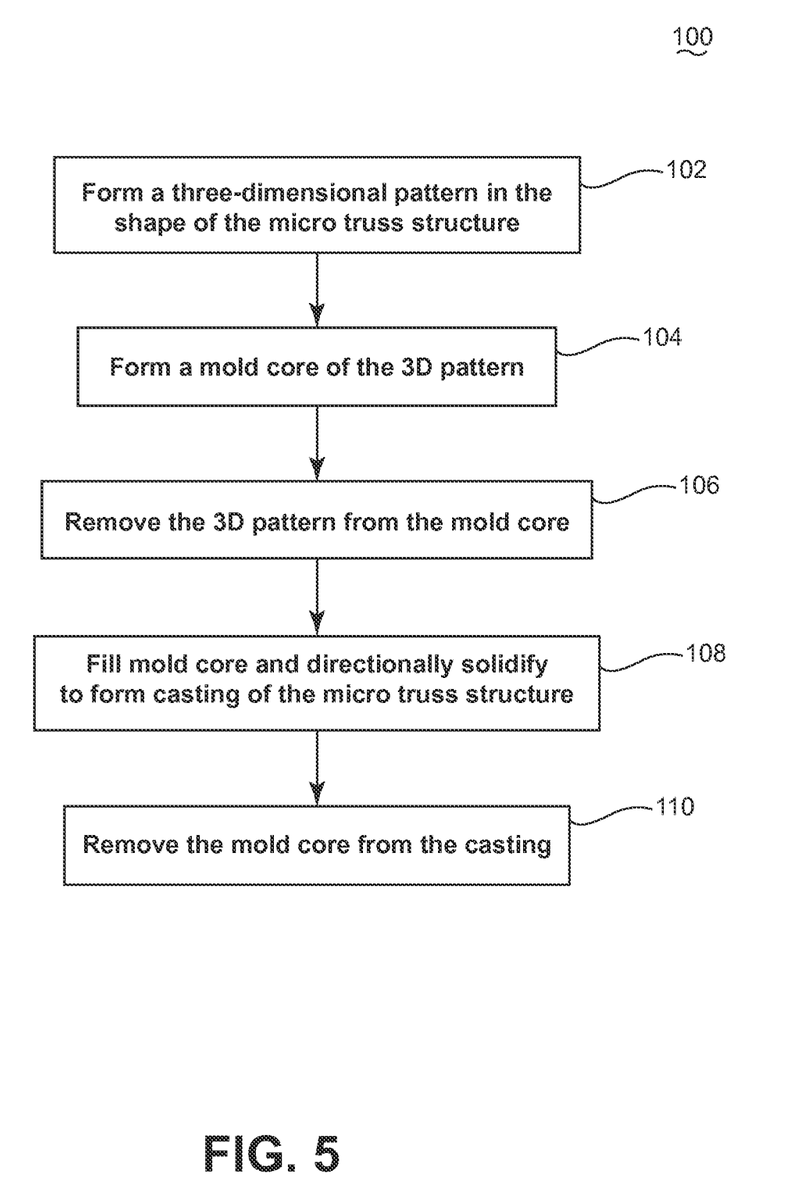
FIG. 5 is a flow chart of a method for casting a truss structure according to an embodiment of the invention.

For example, the truss structure may be formed by casting. In accordance with an embodiment of the invention, FIG. 5 illustrates a method of casting a truss structure having spaced panels or face sheets connected by columnar structures. The method 100 may begin at 102 by forming a 3D pattern in the shape of the truss structure with the spaced face sheets and columnar structures. Forming the 3D pattern may include forming the 3D pattern from a mesh. By way of non-limiting example, the mesh may be made of any suitable polymer material that may allow for the formation of a complex geometry including a micro truss structure. For example a polymer mesh made of polymer additive methods may be used. By way of further example, this may include that the mesh may include a plastic mesh or plastic pattern. The plastic mesh may be formed in any suitable manner including that the plastic mesh may be formed by 3D printing. The 3D pattern may be any suitable pattern including, by way of non-limiting example, that the 3D pattern may include perpendicular columnar structures and/or angled columnar structures as well as spaced face sheets on either side of the columnar structures. For example, forming the 3D pattern in the shape of the truss structure at 102 may include forming at least one of perpendicular columnar structure, which is substantially locally orthogonal to both spaced face sheets, or an angled columnar structure, which is substantially locally at an angle to both spaced face sheets.

At 104, a casting core or mold core of the 3D pattern may be formed by surrounding the pattern with a liquid and letting the liquid harden about the 3D pattern. Any suitable liquid may be utilized to form the mold core. For example, the 3D pattern may be surrounded with a ceramic slurry to form a ceramic casting core. In the instance where the 3D pattern includes a plastic mesh, the mesh may be used to make the mold core, for example, by filing the spaces in the mesh with the ceramic slurry.

At 106, the 3D pattern may be removed from the mold core. This may be done in any suitable manner depending on how the 3D pattern was formed. For example, in the case where a plastic mesh is used, the plastic may be burned out of the mold core. For example, the surrounding slurry and the pattern may be fired to a temperature above 500° C.

After the removing the 3D pattern at 106, the mold core may be filled with a liquid alloy and directionally solidified to form the casting of the truss structure at 108. In this manner, casting of the truss structure may include casting a homogenous or single consistent structure. In the instance where the 3D pattern included spaced face sheets and perpendicular columnar structures and/or angled columnar structures, filling the mold core may include filling the columnar structures that are present as well as the spaced face sheets to have a single crystal structure. Further, this may include filling at least one of a perpendicular columnar structure or an angled columnar structure having an average diameter of about 0.020 inches or less. This may also include filling the spaced face sheets having an average thickness less than 0.050 inches including that the face sheets may have an average thickness of 0.020 inches or less. It will be understood that the above dimensions are merely exemplary and that the thickness of the columnar structures and face sheets may have any suitable thickness. Such dimensions may only be constrained by how thin a line the liquid will fill and how thick a structure can be directionally solidified. This range may be on the order of 0.005 inches for the thinnest to about four to five inches for the thickest. The liquid alloy may be directionally solidified for example, such that the spaced face sheets align with the [100] direction and a given columnar structure aligns with the [110]

direction and other columnar structures align with the [111] direction or some other chosen direction of a cubic crystal structure.

It will be understood that any suitable liquid alloy may be used. For example, a nickel based superalloy may be used. By way of further example, this may also include the use of a liquid alloy that, when the liquid alloy is hardened, which is resistant to temperatures above 1000° F. encountered in turbine 18. For example, the resulting truss structure may be heat resistant at least up to 2400° F. Alternatively any material that may grow as a single crystal is capable of being used to produce the structure. Potential materials are metals, e.g. Fe, Al, Cu; some semiconductors, and some ceramics.

At 110, the mold core may be removed from the casting of the truss structure. The mold core may be removed in any suitable manner, including that the mold core may be broken down and removed from the casting.

It will be understood that the method of casting a truss structure having spaced face sheets connected by columnar structures is flexible and the method 100 illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, the method 100 may also include wax face sheets being applied to the mold core. The core with face sheets may be built into a pattern and the core may be properly supported for growing a directionally solidified casting. Starter blocks may be used for columnar structure or seeds can be used to create a single crystal structure. The pattern may be processed through casting processes of shelling, dewax, firing, and directionally solidified casting. The result may be a columnar or single crystal of the truss structure with face sheets. Further, it is contemplated that forming the 3D pattern in the shape of the truss structure may include forming both the perpendicular columnar structure and the angled columnar structure.

Figure 6:
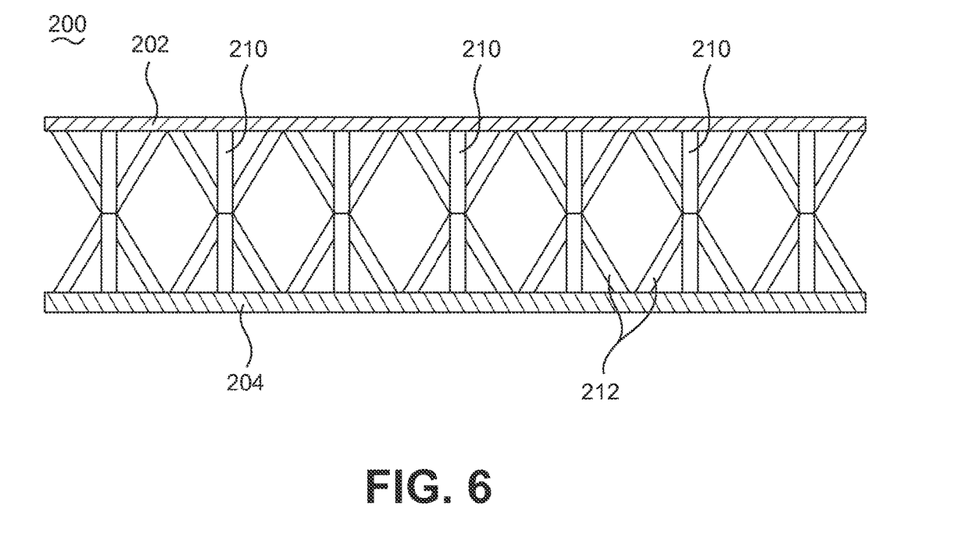
FIG. 6 is a side view of a truss structure that may be formed according to the method in FIG. 5.
Figure 7:
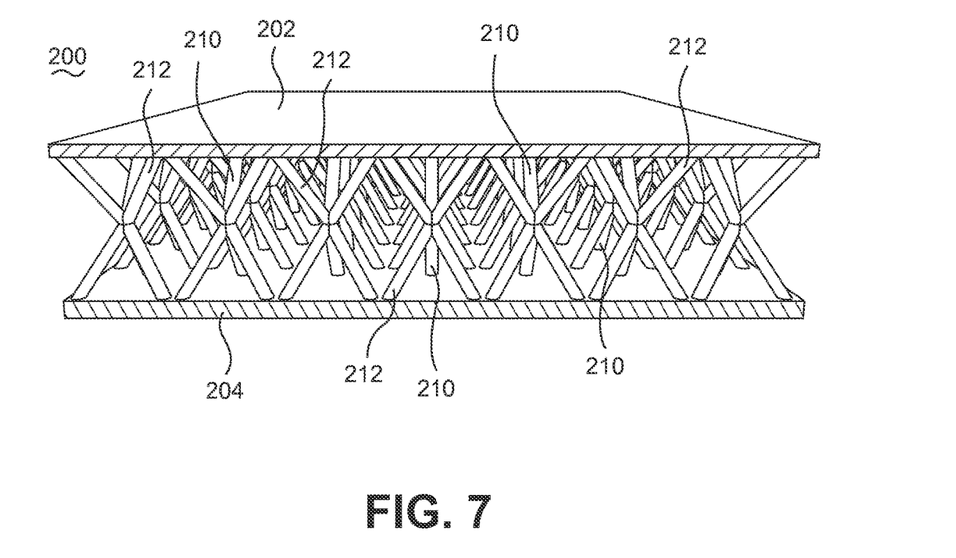
FIG. 7 is a perspective view of the truss structure of FIG. 6.

FIG. 6 is a side view of an exemplary truss structure 200 with face sheets 202 and 204, which may be formed according to the method 100. As illustrated, the truss structure 200 also includes perpendicular columnar structures 210 that are substantially locally orthogonal to both spaced face sheets 202 and 204. Further, the truss structure 200 has also been illustrated as including angled columnar structures 212, which are substantially locally at an angle to both spaced face sheets. The resulting truss structure 200 may have a range of truss structure thickness between 0.040 inches thick to several inches thick. FIG. 7 shows a perspective view of the truss structure 200.

The above described embodiments provide for a variety of benefits including, because of the ability to choose the internal structure orientation, a component including single crystal microstructure or directionally solidified material according to an embodiment of the invention may provide various benefits. For example, it may allow for tailoring the properties of the panel by choosing the relative crystallographic orientation of the face sheets and the columnar structures or trusses. In addition, the structure may lead to superior properties in a resulting airfoil. In addition, a single crystal or directionally solidified high temperature material may provide a truss structure that can function at very high temperatures. Further, because of its strength at high temperature, it could be made to be lightweight. The anisotropic properties of a directionally solidified or single crystal structure according to embodiments of the invention may also allow for further enhancement of internal or external features based on crystal orientation.

The above described embodiments allow for the forming the component containing a single crystal or directionally solidified high temperature material, which allows a design of the component from the inside-out. For example, the design may allow there to be metallic material only where needed to address weight, vibration, strength, etc. In addition, directionally solidified casting allows the filling of the fine structure. Further, an open truss structure may allow a cooling medium to be passed through the truss to cool the whole panel. In addition, directional solidification or single crystal casting of these structures may be more cost effective than other possible fabrication methods such as those involving brazing separate pieces together. Furthermore, the above described embodiments allow a structure to be made without any welds, joints, or brazes.

The above described embodiments may be used to create a rotor blade that is cost-effective and highly reliable. The rotor blade includes an airfoil having a central plenum and an impingement chamber. A number of cooling techniques are employed to cool the exterior sidewalls of the airfoil, such as impingement cooling and near-wall cooling. The arrangement of the central plenum and the impingement chamber provide for an improved flow of cooling fluid that facilitates cooling the exterior sidewalls of the airfoil more evenly than known airfoils. Such an arrangement is made possible by advances in fabrication techniques. For example, the rotor blades described herein may be produced by investment casting, resulting in single-crystal or directionally solidified blades. The embodiments described herein provide for improved cooling efficiency and stiffness and weight characteristics. As a result, cooler operating temperatures within the rotor blade facilitate extending a useful life of the rotor blades in a cost-effective and reliable manner.

Another environment for the truss structure may be its use as the leading edge of a wing structure. A wing moving through the atmosphere at high velocity heats up as a result of the friction with the atmosphere. This heating is most pronounced at the leading edge. One method of producing a structure that may carry the required loads at high temperature is a truss structure produced from superalloy single crystals as described herein. Additionally, to increase the temperature capability, it would be possible to cool the leading edge as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A method of casting a truss structure of an airfoil, the airfoil having first and second sidewalls connected at axially spaced leading and trailing edges to define an internal cavity and a central plenum defined by a central plenum wall located within and spaced from the first and second sidewalls, the truss structure having spaced face sheets formed by opposing first and second sidewalls and the central plenum wall connected by columnar structures coupling the central plenum wall to the first and second sidewalls, the method comprising:

forming a three-dimensional pattern (3D pattern) in the shape of the truss structure with the spaced face sheets and columnar structures;

forming a mold core of the 3D pattern by surrounding the pattern with a liquid and letting the liquid harden about the 3D pattern;

removing the 3D pattern from the mold core;

after the removing the 3D pattern, filling the mold core with a liquid alloy and directionally solidifying the liquid alloy to form the casting of the truss structure coupling the central plenum wall to the first and second sidewalls; and removing the mold core from the casting of the truss structure.

2. The method of claim 1 wherein the forming the 3D pattern comprises forming the 3D pattern from a plastic mesh.

3. The method of claim 2 wherein the forming the plastic mesh comprises forming the plastic mesh by 3D printing.

4. The method of claim 1 wherein the surrounding the pattern with the liquid comprises surrounding the pattern with a ceramic slurry.

5. The method of claim 1 wherein forming the 3D pattern in the shape of the truss structure comprises forming at least one of perpendicular columnar structure, which is locally orthogonal to both spaced face sheets, or an angled columnar structure, which is locally oblique to both spaced face sheets.

6. The method of claim 5 wherein the forming the 3D pattern in the shape of the truss structure comprises forming both the perpendicular columnar structure and the angled columnar structure.

7. The method of claim 6 wherein the filling the mold core comprises filling at least one of the perpendicular and angled columnar structures to have a single crystal structure.

8. The method of claim 7 wherein the filling the mold core comprises filling the spaced face sheets to have a single crystal structure.

9. The method of claim 8 wherein the spaced face sheets have a crystalline structure and the angled columnar structure has a crystalline structure.

10. The method of claim 5 wherein the filling the mold core comprises filling at least one of a perpendicular columnar structure or an angled columnar structure having an average diameter of about 0.020 inches or less.

11. The method of claim 10 wherein the filling the mold core comprises filling the spaced face sheets having an average thickness of 0.050 inches or less.

12. The method of claim 11 wherein the liquid alloy, when hardened, is resistant to temperatures above 1000° F.

13. The method of claim 11 wherein the casting of the truss structure comprises casting a homogenous structure.

14. A method of casting a truss structure of an airfoil, the airfoil having first and second sidewalls connected at axially spaced leading and trailing edges to define an internal cavity and a central plenum defined by a central plenum wall located within and spaced from the first and second sidewalls, the truss structure having spaced face sheets formed by opposing first and second sidewalls and the central plenum wall connected by perpendicular and angular columnar structures coupling the central plenum wall to the first and second sidewalls, the method comprising:

forming a three-dimensional plastic pattern (3D pattern) in the shape of the truss structure with the spaced face sheets, perpendicular columnar structures, and angled columnar structures;

forming a mold core of the 3D pattern by surrounding the pattern with a ceramic slurry and letting the ceramic slurry harden about the 3D pattern to form a ceramic mold core;

removing the 3D pattern from the ceramic mold core by firing the 3D pattern;

after removing the 3D pattern, filling the ceramic mold core with a liquid alloy and directionally solidifying the liquid alloy to form the casting of the truss structure coupling the central plenum wall to the first and second sidewalls; and removing the mold core from the casting of the truss structure;

wherein the resulting truss structure is heat resistant at least up to 2400° F., the spaced face sheets each have an average thickness less than 0.050 inches, and the perpendicular and angled columnar structures have an average diameter of less than 0.020 inches.

15. The method of claim 14 wherein the resulting truss structure has a thickness less than 4 inches.

* * * * *